United States Patent [19]
Katoh

[11] Patent Number: 6,116,491
[45] Date of Patent: Sep. 12, 2000

[54] GAS FLOW CONTROLLING DEVICE AND SOLDERING APPARATUS USING SAME

[75] Inventor: Toshimitsu Katoh, Yokohama, Japan

[73] Assignee: Nihon Den-Netsu Keiki Co. Ltd., Japan

[21] Appl. No.: 09/006,998

[22] Filed: Jan. 14, 1998

[30] Foreign Application Priority Data

Jan. 20, 1997 [JP] Japan ..................................... 9-007651
Oct. 7, 1997 [JP] Japan ..................................... 9-274080

[51] Int. Cl.[7] .............................. B23K 1/00; B23K 1/08; B23K 31/02; B67D 5/00
[52] U.S. Cl. .............................. 228/42; 228/37; 228/219; 22/3; 22/4
[58] Field of Search ..................................... 228/207, 214, 228/219, 223, 14, 16, 201.1, 31, 33, 37, 42, 49.1; 222/3, 4

[56] References Cited

U.S. PATENT DOCUMENTS

| | | | |
|---|---|---|---|
| 4,143,470 | 3/1979 | Vandergriff | 34/10 |
| 4,564,135 | 1/1986 | Barresi et al. | 228/6.2 |
| 5,121,874 | 6/1992 | Deambrosio et al. | 228/219 |
| 5,358,167 | 10/1994 | Tachibana et al. | 228/42 |
| 5,409,159 | 4/1995 | Connors et al. | 228/219 |
| 5,685,475 | 11/1997 | Jairazbhoy | 228/37 |
| 5,794,836 | 8/1998 | Lin et al. | 228/33 |

*Primary Examiner*—Patrick Ryan
*Assistant Examiner*—Kiley Stoner
*Attorney, Agent, or Firm*—Lorusso & Loud

[57] ABSTRACT

A gas flow controlling device including a housing having a gas inlet and a gas outlet and defining therewithin a gas flow passage diverging in the direction from the inlet to the outlet so that the cross-sectional area of the gas flow passage increases from the inlet to the outlet, and a plurality of spaced apart baffle plates provided in the gas flow passage to render the gas flow passage meandering. An apparatus for soldering an article, including a wave-soldering zone for contacting the article with a solder wave, and one or more above-mentioned gas flow controlling devices for establishing an inert gas atmosphere in the soldering zone.

13 Claims, 12 Drawing Sheets

GAS FLOW CONTROLLING DEVICE AND SOLDERING APPARATUS USING SAME

BACKGROUND OF THE INVENTION

This invention relates to a gas flow controlling device and to a soldering apparatus using same.

A molten metal such as molten solder is apt to be oxidized when contacted with air. To cope with this problem, an inert gas such as nitrogen is continuously streamed to a mass of the molten metal to form an oxygen-free atmosphere therearound.

Figure 12:
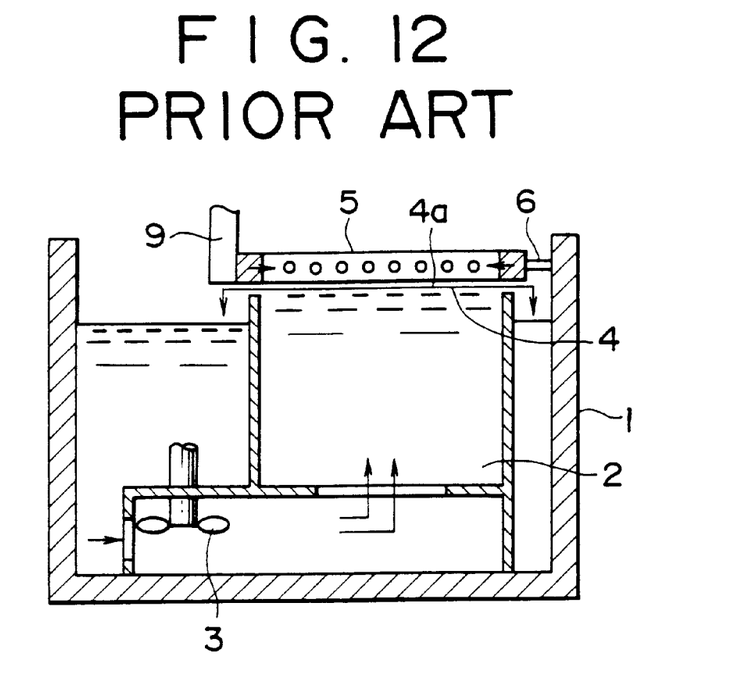
FIG. 12 is a cross-sectional, elevational view schematically illustrating a conventional soldering apparatus.
Figure 13:
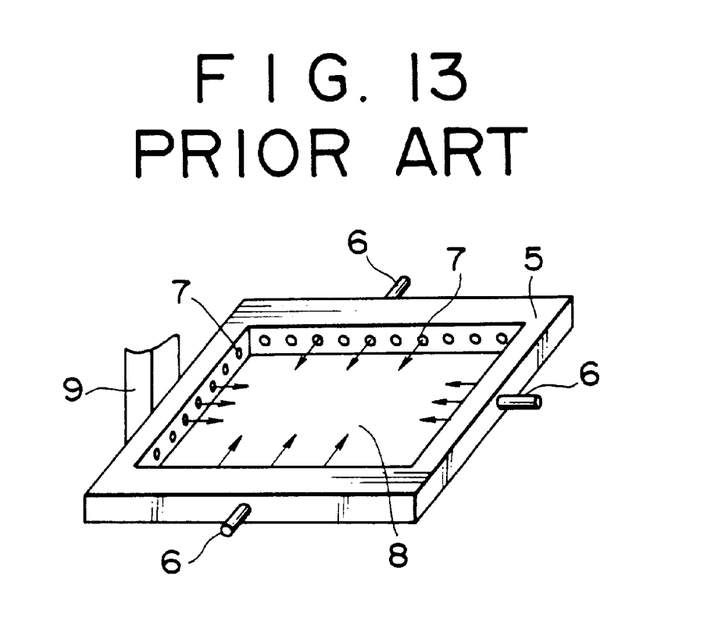
FIG. 13 is a perspective view schematically illustrating an inert gas injection device of the soldering apparatus of FIG. 12.

JP-A-7-185790 discloses a device for soldering printed wiring boards as shown in FIGS. 12 and 13. Designated as 1 is a solder vessel for containing a molten solder 2. The molten solder 2 is upwardly ejected by a pump 3 to form a solder wave 4. An inert gas feeder having a square ring 5 is supported by bars 6 on the vessel 1 to surround the surface 4a of the solder wave. The ring 5 is provided with a multiplicity of injection holes 7 from which an inert gas supplied from a gas feed pipe 9 is injected toward the solder wave surface 4a to form an inert gas atmosphere 8 over the solder wave surface 4a. The known soldering device has a problem because air surrounding the jetted inert gas atmosphere 8 is sucked thereinto so that the oxygen concentration of the inert gas atmosphere is not sufficiently low, whilst a relatively large amount of the inert gas is consumed.

JP-A-8-39829 discloses a device for wave soldering printed wiring boards. The solder wave is covered with a casing in which an injection nozzle is disposed. An inert gas is injected from the nozzle toward the solder wave to maintain the space within the casing in the inert gas atmosphere. This soldering device, too, has a problem that air is sucked in the casing by the jet flow of the inert gas. Additionally, air enters the casing through inlet and outlet openings thereof for the printed circuit board to be soldered.

SUMMARY OF THE INVENTION

It is, therefore, an object of the present invention to provide a soldering apparatus with which the soldering can be performed in an inert gas atmosphere with an extremely low oxygen content.

Another object of the present invention is to provide a soldering apparatus with which the consumption of the inert gas can be significantly saved.

It is a specific object of the present invention to provide a soldering apparatus which permits the soldering of printed wiring boards under an inert, substantially non-oxidizing atmosphere and with a reduced amount of a flux.

It is a further object of the present invention to provide a gas flow controlling device capable of forming a gas stream which does not suck air surrounding the gas stream.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 1:
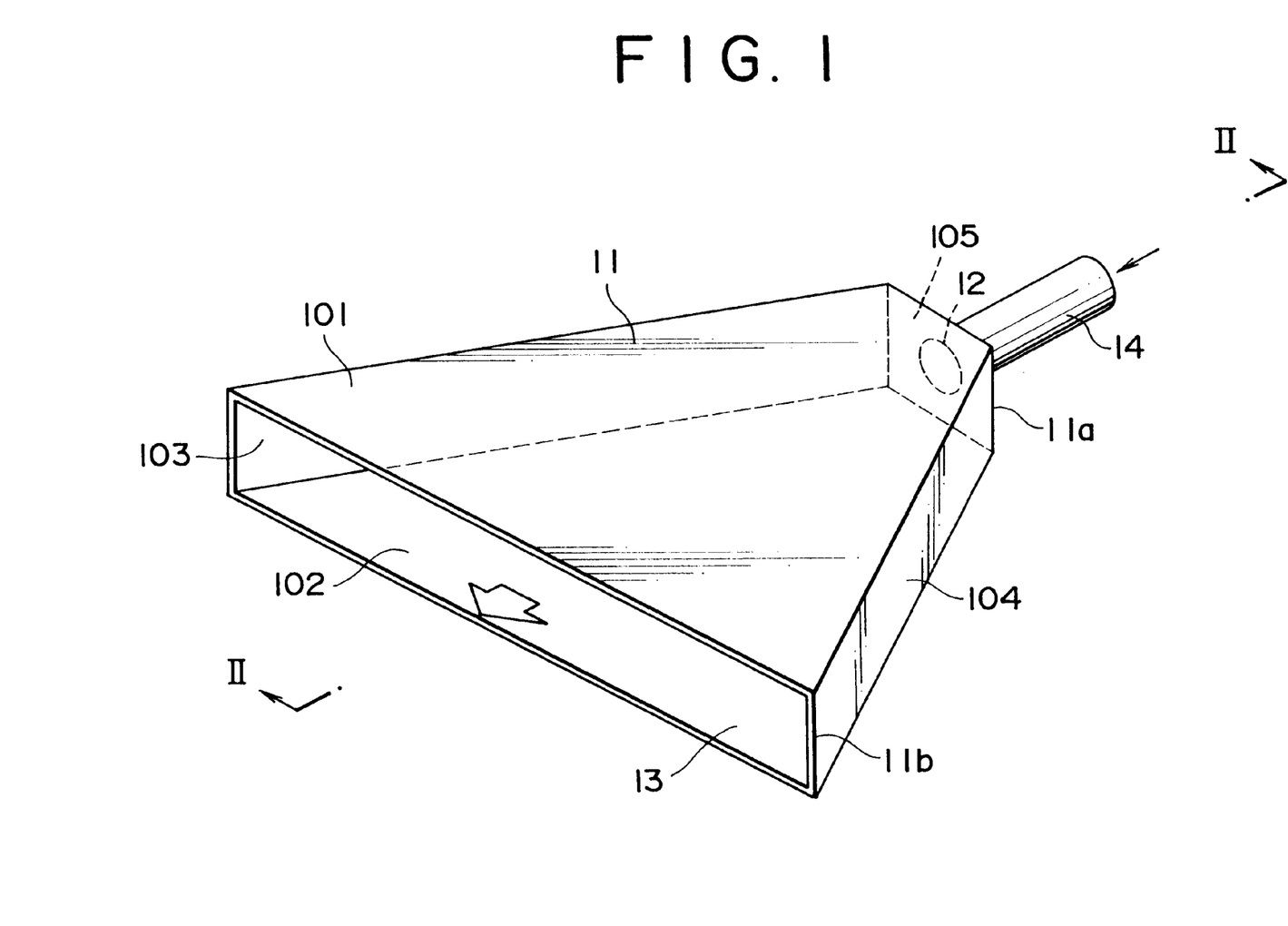
FIG. 1 is a perspective view diagrammatically illustrating a first embodiment of a gas flow controlling device according to the present invention.

FIG. 1 depicts a first embodiment of a gas flow controlling device according to the present invention. The gas flow controlling device includes a housing member 11 having a gas inlet 12 and a gas outlet 13 and defining therewithin a gas flow passage 17 diverging in the direction from a converging end 11a to a diverging end 11b so that the cross-sectional area of the gas flow passage increases from the inlet 12 to the outlet 13.

In the specific embodiment shown, the housing 11 is constructed from (a) a pair of opposing first and second plates 101 and 102 each having opposing long front end (constituting the diverging end 11b) and short rear end (constituting the converging end 11a) and opposing side ends, (b) a pair of opposing third and fourth plates 103 and 104 connecting the side ends of the first and second plates 101 and 102 such that the outlet 13 is defined by the first through fourth plates at the diverging end 11b and (c) a rear plate 105 provided with the inlet 12. Each of the first and second plates 101 and 102 is enlarged from the rear end to the front end so that the cross-sectional area of the gas flow passage 17 increases from the rear end to the front end. In the illustrated embodiment, the first and second plates 101 and 102 are in parallel with each other. If desired, however, these plates 101 and 102 may be inclined relative to each other. A gas feed pipe 14 is connected to the inlet 12.

Figure 2:
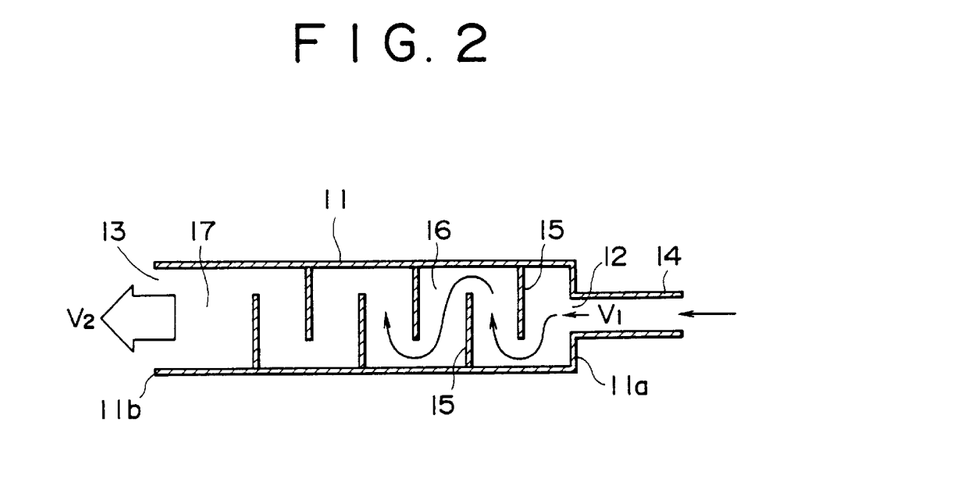
FIG. 2 is a sectional view taken along line II—II in FIG. 1.

As shown in FIG. 2, a plurality of spaced apart baffle plates 15 are provided in the gas flow passage 17 to form a meandering flow passage 16. In the illustrated embodiment, each of the baffle plates 15 extends from the third plate 103 to the fourth plate 104. Further, the baffle plates 15 extend alternately from the first and second plates 101 and 102 and terminate to define gaps between the terminal ends and the second and first plates 102 and 101, respectively.

As a consequence of the above construction, an inert gas such as nitrogen gas introduced from the feed pipe 14 at a velocity $V_1$ into the flow controlling device exits the flow controlling device from the outlet 13 at a velocity $V_2$ which is much lower than $V_1$. Namely, the inert gas successively impinges on respective baffle plates 15 so that the dynamic pressure thereof is gradually reduced during its passage through the meandering path 16. Additionally, since the cross-sectional area of the path 16 increases from the inlet 12 to the outlet 13, the flow velocity of the inert gas decreases during its passage through the meandering path 16. Since the gas velocity $V_2$ is very low, no sucking of the atmosphere surrounding the outlet 13 occurs. Since the flow velocity of the inert gas exiting the outlet 13 is immediately reduced to substantially zero, the inert gas moves predominantly by diffusion. There is thus formed a substantially oxygen-free inert gas atmosphere at a position adjacent the outlet 13, even when the feed rate of the inert gas from the inlet 12 is small.

Figure 3:
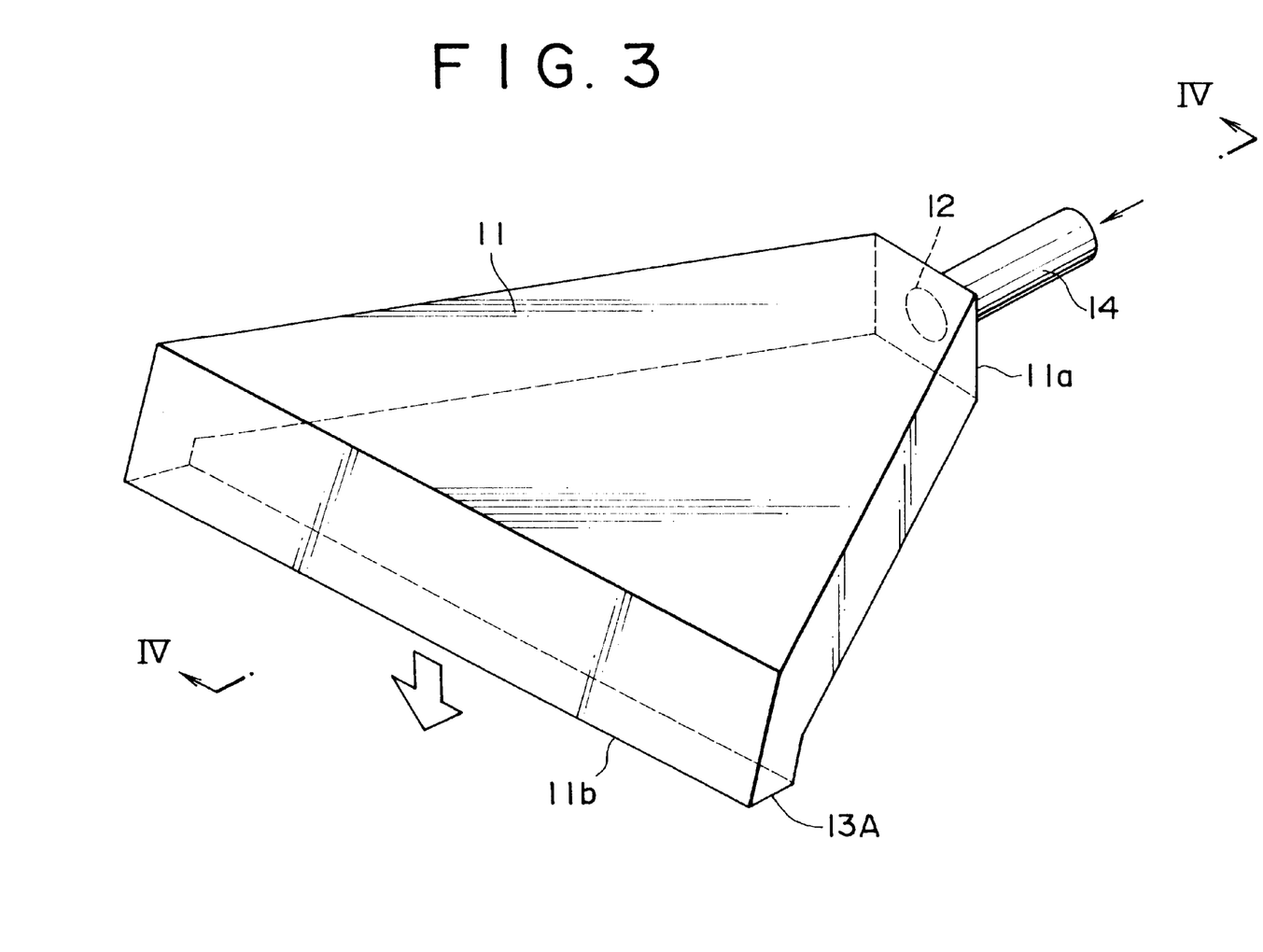
FIG. 3 is a perspective view diagrammatically illustrating a second embodiment of a gas flow controlling device according to the present invention.
Figure 4:
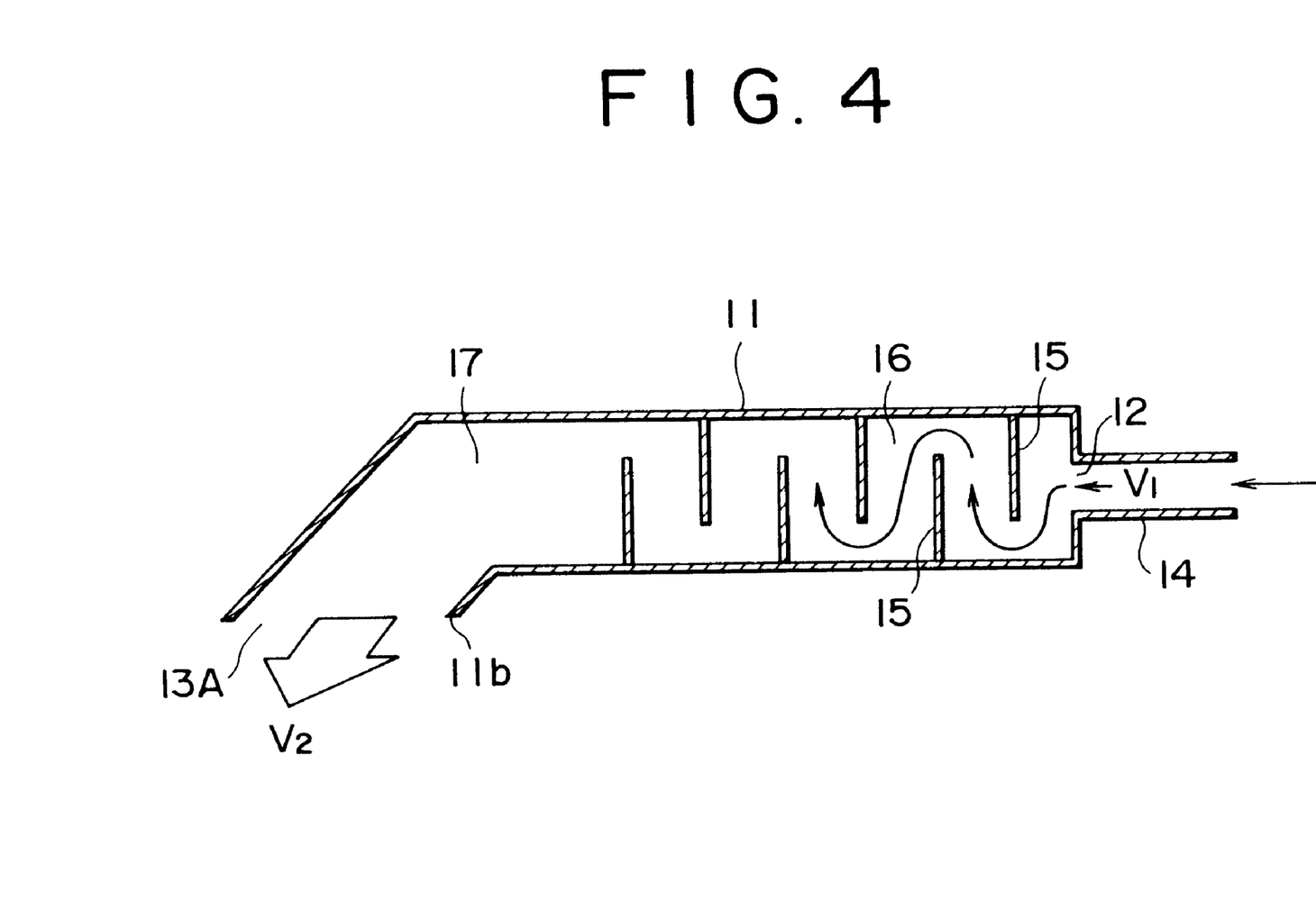
FIG. 4 is a sectional view taken along line IV—IV in FIG. 1.

FIGS. 3 and 4 depict another embodiment of the gas flow controlling device according to the present invention, in which the same reference numerals as those in FIGS. 1 and 2 designate similar component parts. The second embodiment differs from the embodiment of FIGS. 1 and 2 only in the structure of the gas exit. A portion adjacent the diverging end 11b is bent so that an outlet 13A is oriented downward. The orientation angle may be appropriately determined according to the intended use of the gas flow controlling device.

Figure 5:
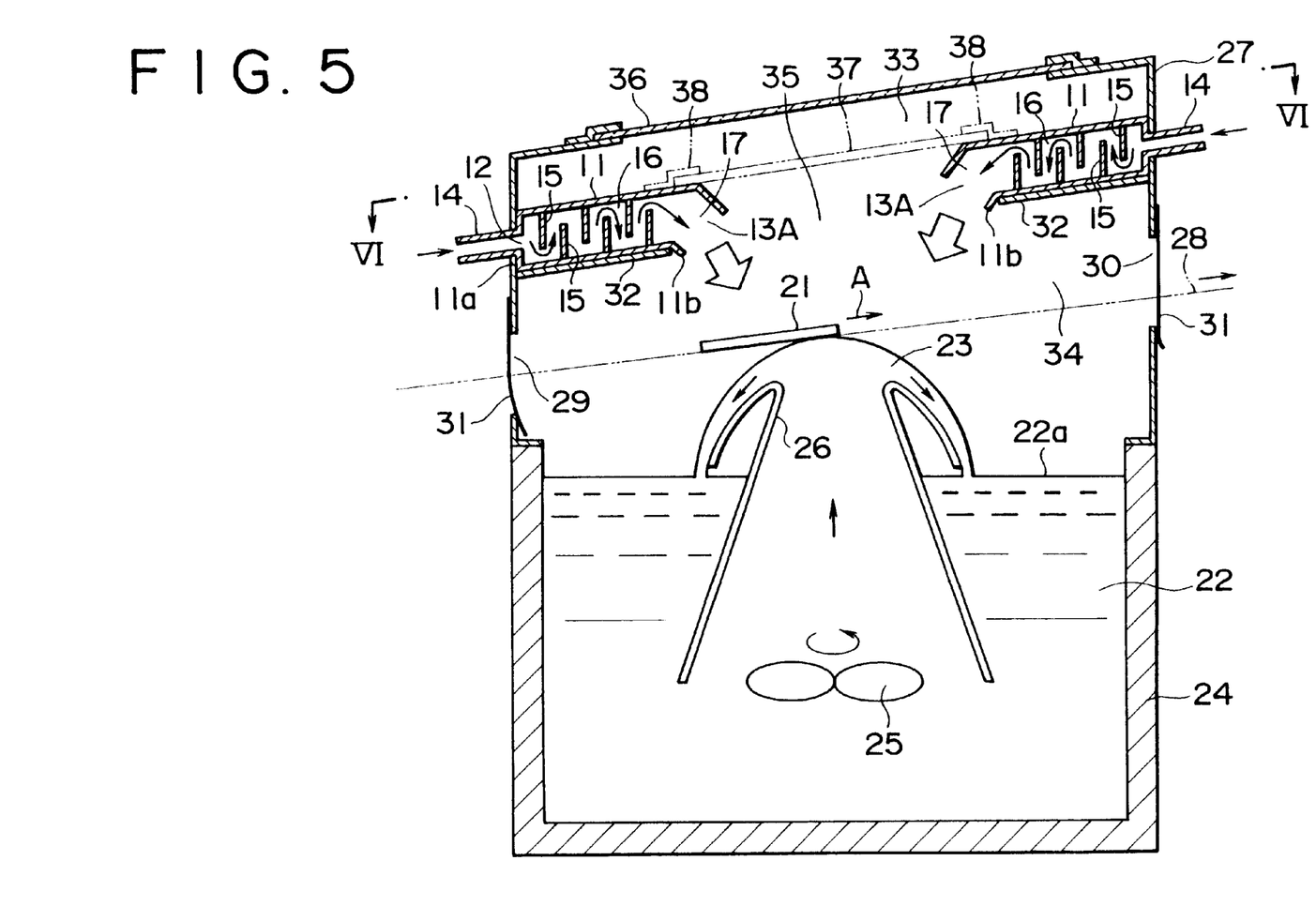
FIG. 5 is a cross-sectional, elevational view schematically illustrating a first embodiment of a soldering apparatus according to the present invention.
Figure 6:
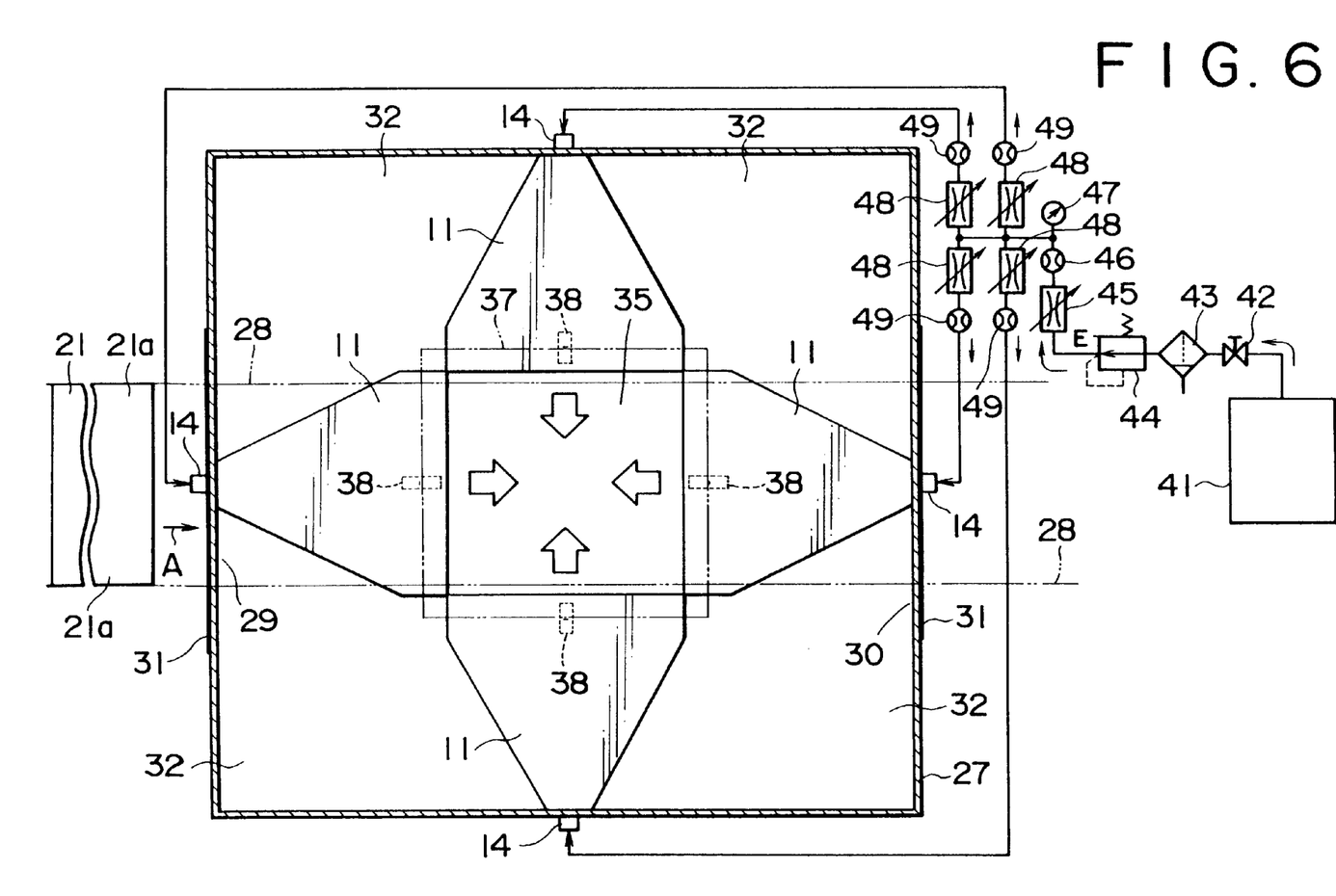
FIG. 6 is a sectional view taken along line VI—VI in FIG. 5.

FIGS. 5 and 6 depict a soldering apparatus according to the present invention using the above-described gas flow controlling device. The soldering apparatus has a solder vessel 24 for containing a molten solder 22. A heater (not shown) is disposed in the vessel 24 for maintaining the molten solder 22 at a suitable temperature. Designated as 22a is the surface level of the molten solder 2 in the vessel 24.

A nozzle 26 is disposed in the solder vessel 24 for upwardly ejecting the molten solder 22 therefrom by the operation of a pump 25 to form a solder wave 23 thereabove. An article to be soldered, such as a printed wiring board 21, is conveyed by transfer means 28, such as a pair of conveyor chains for supporting the board 21 at both sides 21a thereof (FIG. 6) thereon, along a predetermined path in the direction shown by the arrow A so that the wiring board 21 is contacted with the solder wave 23.

Designated as 27 is a casing defining a chamber therewithin and covering the vessel 24. The casing has inlet and outlet openings 29 and 30 such that the printed wiring board 21 transferred along the predetermined path can pass therethrough. Each of the inlet and outlet openings 29 and 30 is covered with a flexible cover 31 such as a rubber sheet depending from an upper part of the opening. The cover 31 is bent when pushed by the printed wiring board 21 to permit the passage of the board through the openings 29 and 30 and, thereafter, returns to the original shape to close the opening.

A partition plate 32 is disposed within the chamber of the casing 27 to divide the chamber into an upper space 33 and a lower space 34. The partition plate 32 has an aperture 35 adjacent the solder wave 23 so that the upper space 33 is in gas communication with the lower space 34 only through the aperture 35. Designated as 36 is a glass plate provided in the top wall of the casing 27 so that the solder wave can see therethrough.

Inert gas feeding means is provided for supplying an inert gas to the lower space 34 through the aperture 35. The inert gas feeding means includes at least one gas flow controlling device. In the illustrated embodiment, four gas flow controlling devices as shown in FIGS. 3 and 4 are disposed on the partition plate 32 such that, as shown in FIG. 6, a pair of the housings 11 of the gas flow controlling devices are disposed opposite to each other to supply the inert gas in the direction normal to the transfer direction of the printed circuit board 21 (arrow A) and opposite to each other, while another pair of the housings 11 of the gas flow controlling devices are disposed opposite to each other to supply the inert gas in the directions same as and opposite to the arrow A, as shown by white arrows.

The inert gas feeding means includes an inert gas feed source 41 such as a nitrogen gas cylinder, a shut off valve 42, a filter 43 for removing dusts, a pressure controlling valve 44, a flow rate controlling valve 45, a flow meter 46, a pressure meter 47 and pipes for connecting the above instruments. Additionally, pipes are branched from the pipe downstream of the flow meter 46 and led to the gas feed pipes 14 of respective gas flow controlling devices. Designated as 48 and 49 are flow control valve and flow meter, respectively. Thus, the inert gas having a desired gas feed rate can be fed to each of the flow controlling devices.

The inert gas discharged from the outlets 13A streams at a low velocity through the aperture 35 into the lower chamber 34 toward the soldering zone at which the printed circuit board 21 is contacted with the solder wave 23. The inert gas also flows on the surface 22a of the molten solder 22 in the vessel 24 to form an oxygen-free atmosphere thereon. The inert gas is finally discharged from the lower space 34 through the openings 29 and 30 of the casing 27. In the above-described soldering apparatus, since the inside of the casing 27 is divided by the partition plate 32, undesirable convection and turbulence gas flow can be prevented. Thus, when the openings 29 and 30 are opened at the time of entrance and exit of the printed wiring board, air can enter only in the vicinity of the openings 29 and 30 and is prevented from streaming deep into the lower space 34.

The housings 11 of the flow controlling devices disposed in the chamber of the casing 27 are heated by the heat generated from the molten solder 22. As a result, the inert gas is also heated during its passage through the meandering path 16 and does not cause the lowering of the temperature of the printed wiring board 21. Since a very low oxygen content atmosphere can be established in the soldering device according to the present invention, the amount of a flux previously applied to the article to be soldered can be minimized, permitting "micro-soldering", i.e. extremely fine portions can be suitably soldered. The reduction of the amount of the flux also provides a merit that a treatment for the removal of the flux after soldering may be omitted.

If desired, a transparent cover plate such as a glass plate 37 may be disposed in the upper space 33 to reduce that space in the upper space 33 which is in gas communication with the lower space 34. In the illustrated embodiment, the glass plate 37 is placed on the top of the housings 11 and detachably secured thereto by holders 38.

Figure 7:
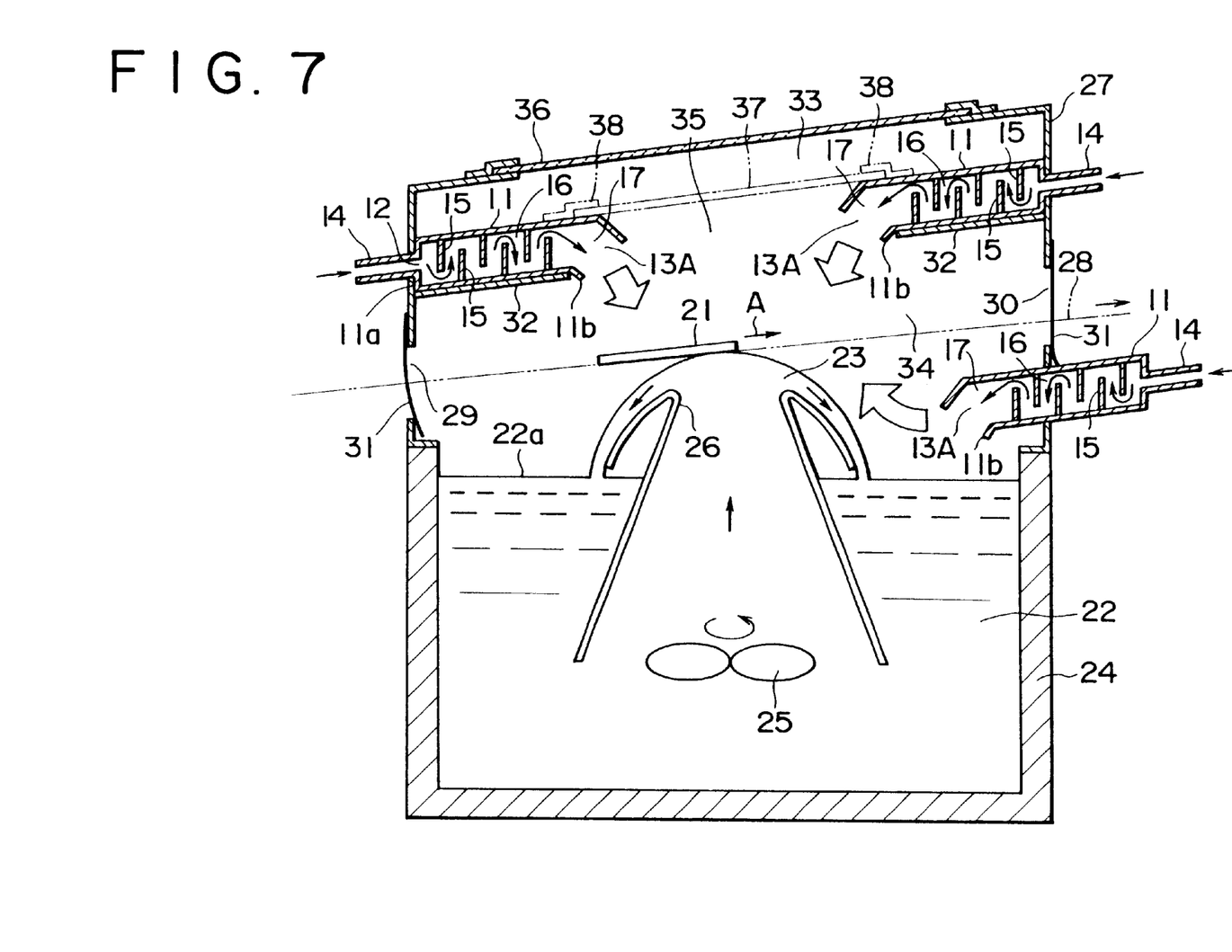
FIG. 7 is a cross-sectional, elevational view schematically illustrating a second embodiment of a soldering apparatus according to the present invention.

FIG. 7 depicts another embodiment of the soldering apparatus according to the present invention, in which the same reference numerals as those in FIGS. 5 and 6 designate similar component parts. The second embodiment differs from the embodiment of FIGS. 5 and 6 only in that an additional gas flow controlling device is provided in the outlet opening 30 below the path of travel of the printed circuit board 21. The gas outlet 13A of this additional flow controlling device opens to the surface 22a of the molten solder 22 so that the oxygen content in the vicinity of the solder surface 22a can be further reduced. Moreover, the inert gas can reach the "peel back point" of the printed wiring board 21 at which the board 21 disengages from the solder wave 23.

Figure 8:
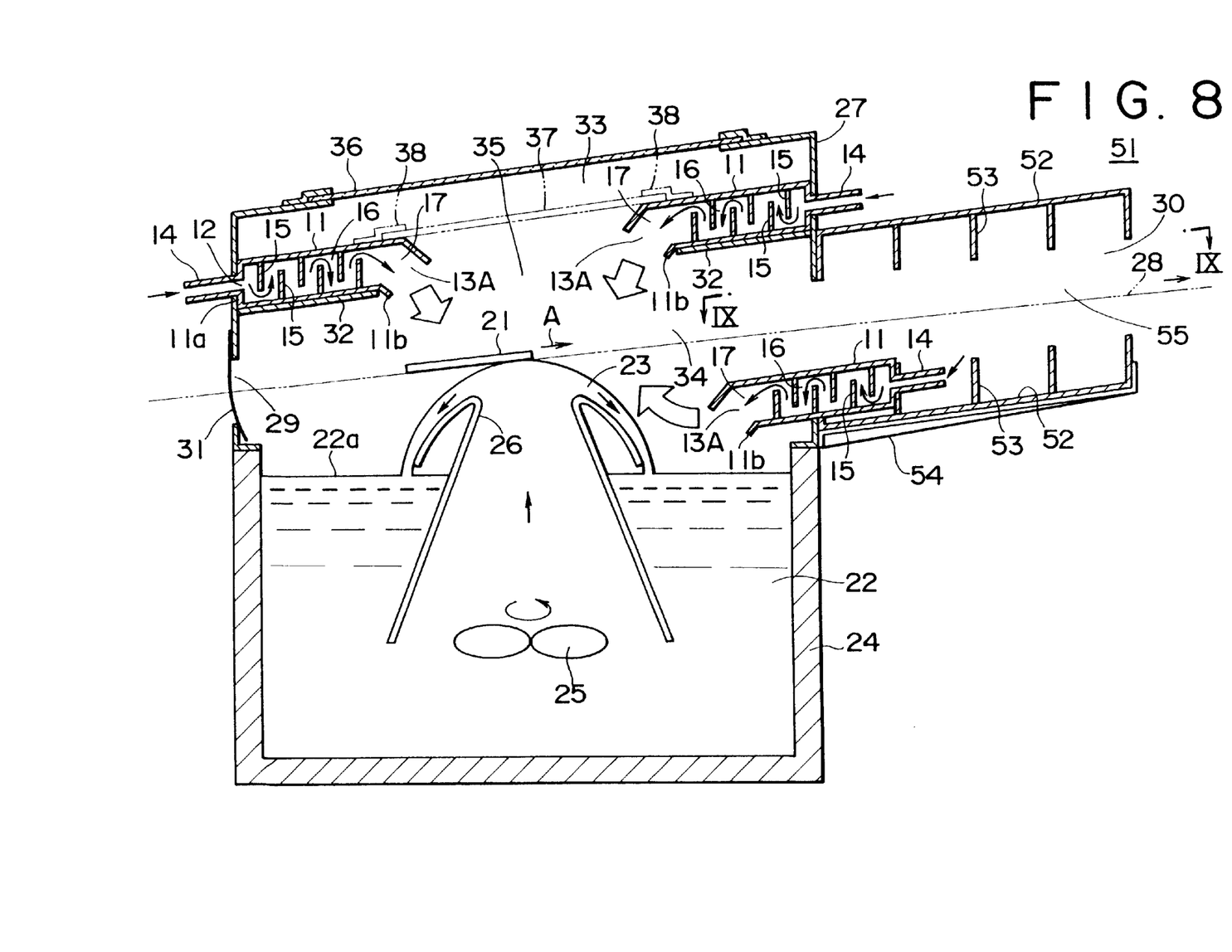
FIG. 8 is a cross-sectional, elevational view schematically illustrating a third embodiment of a soldering apparatus according to the present invention.
Figure 9:
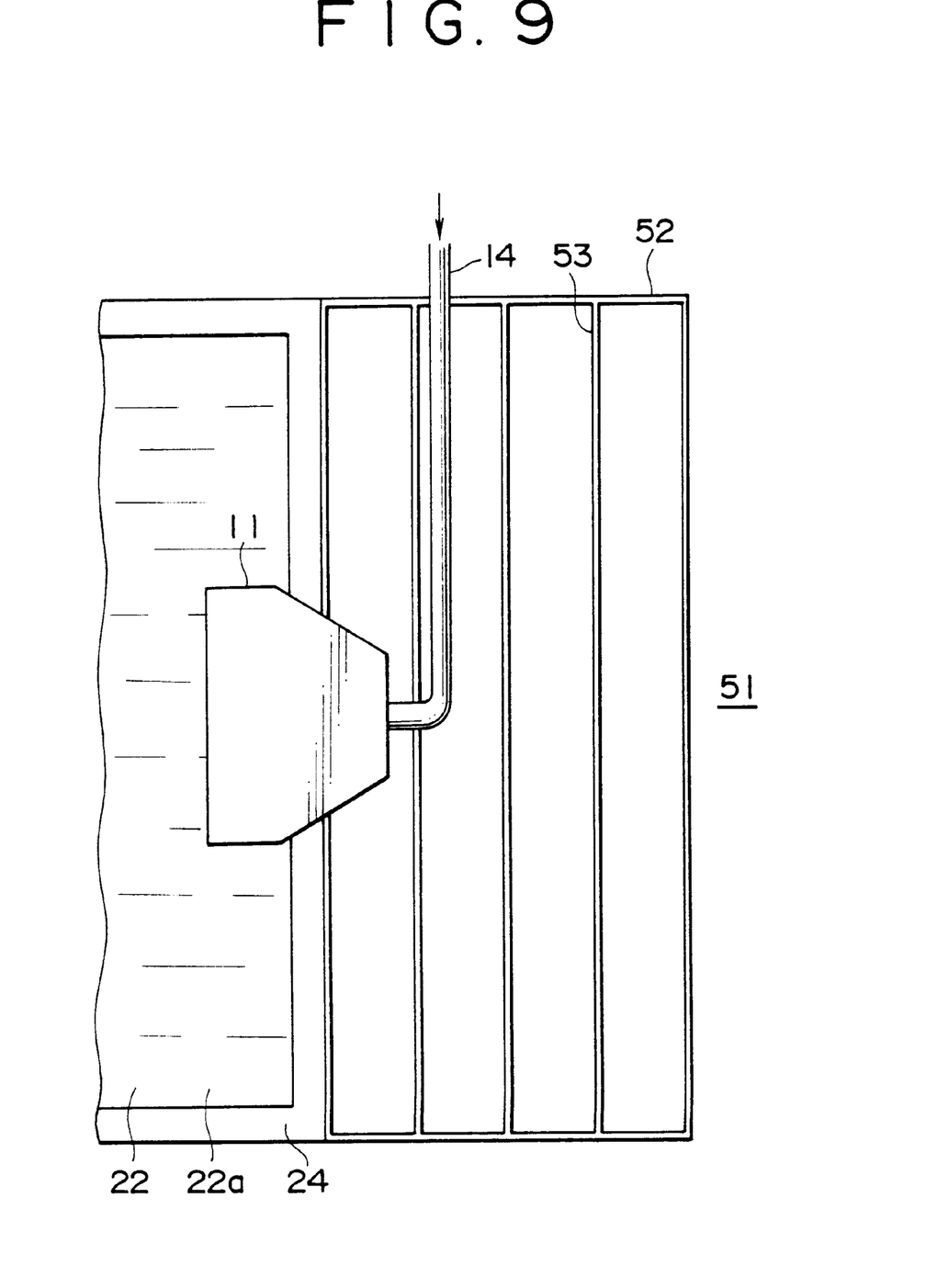
FIG. 9 is a sectional view taken along line IX—IX in FIG. 8.

FIGS. 8 and 9 depict a further embodiment of the soldering apparatus according to the present invention, in which the same reference numerals as those in FIG. 7 designate similar component parts. The third embodiment differs from the embodiment of FIG. 7 only in that a labyrinth 51 is connected to the outlet opening 30 of the second embodiment in place of the cover plate 31. The labyrinth 51 has a tubular housing 52 having top and bottom walls and defining an outlet path 55 therewithin. A plurality of upper and lower, spaced apart partition plates 53 disposed in the outlet path 52 to partition the outlet path 52 into a plurality of open ended chambers. Each of the upper plates extends downward from the top wall, while each of the lower plates extends upward from the bottom wall, with each of the upper and lower plates terminating so as not to interfere with the predetermined path of travel of the printed wiring board 21. Designated as 54 is a support secured to the vessel 24 for mounting the labyrinth 51 thereon.

By providing the labyrinth 51, entrance of air from the outlet opening 30 into the chamber of the casing 27 is almost completely prevented. Since the path of travel of the printed wiring board 21 is generally inclined as illustrated, the atmosphere in the casing 27 is discharged more easily from the outlet opening 30 than from the inlet opening 29. Thus, it is preferred that the labyrinth 51 be provided in the outlet side, as illustrated. Similar labyrinth may be also provided in the inlet opening 29. The flow controlling device may be omitted, if desired.

Figure 10:
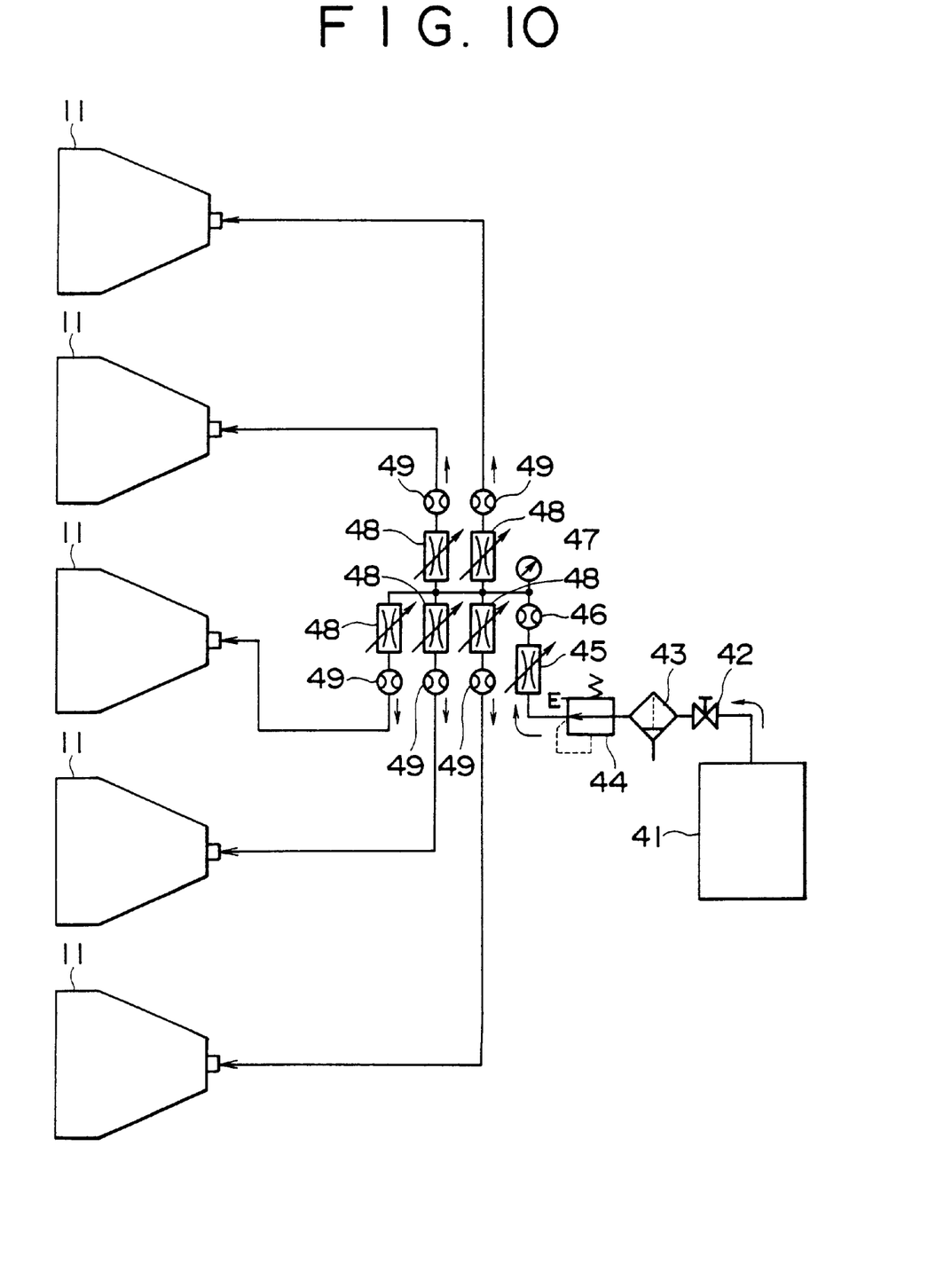
FIG. 10 is a flow diagram schematically illustrating an inert gas feeding device according to the present invention.

FIG. 10 is a flow diagram of the inert gas feeding device of the soldering apparatuses of FIGS. 7 and 8, in which the same reference numerals as those in FIG. 6 designate similar component parts. In this embodiment, five branched pipes are connected to respective housings 11 of the five gas flow controlling devices.

Figure 11:
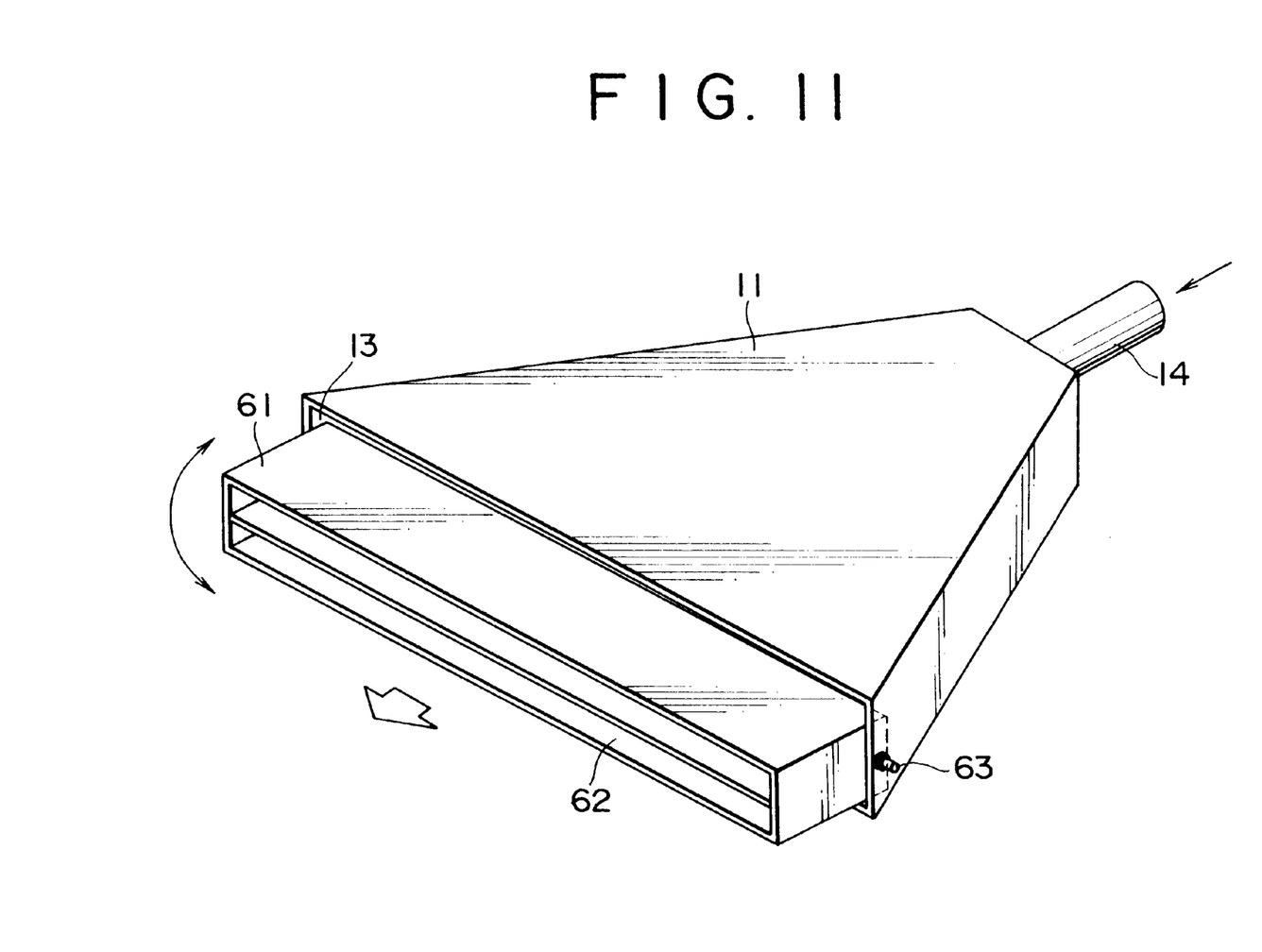
FIG. 11 is a perspective view diagrammatically illustrating a third embodiment of a gas flow controlling device according to the present invention.

FIG. 11 depicts a further embodiment of a gas flow controlling device according to the present invention, in which the same reference numerals as those in FIG. 1 designate similar component parts. A flow direction controlling member 61 having a gas discharging opening 62 is received in an outlet opening 13. The flow direction controlling member 61 has a pair of pins rotatably received in holes of a housing 11. By adjusting the orientation direction of the flow direction controlling member 61, the flow direction of the inert gas can be adjusted.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. An apparatus for soldering an article, comprising:
   means for contacting the article with a molten solder in a soldering zone, and
   inert gas feeding means for supplying an inert gas to said soldering zone,
   said inert gas feeding means including at least one gas flow controlling device comprising:
      a housing member having a gas inlet and a gas outlet and including a pair of opposing first and second plates, each of said first and second plates extending from a short edge adjacent said gas inlet to a long edge, longer than said short edge and adjacent said gas outlet, each of said first and second plates having opposing and diverging side edges joining said long and short edges, and a pair of opposing third and fourth plates joining the diverging side edges of said first and second plates to define within said housing a gas flow passage of a cross-sectional area which increases from said gas inlet to said gas outlet, and
      a plurality of spaced apart baffle plates alternately depending from said first and second plates,
   whereby the article is contacted with said molten solder in said soldering zone in an atmosphere of said inert gas supplied by said inert gas feeding means through said gas outlet.

2. An apparatus for soldering an article, comprising:
   a solder vessel for containing a molten solder;
   solder ejecting means having a wave nozzle disposed in said solder vessel for upwardly ejecting the molten solder therefrom to form a solder wave thereabove;
   transfer means for transferring the article along a predetermined path of travel so that the article is contacted with the solder wave during the passage thereof through said path;
   a casing defining a chamber therewithin and covering said vessel, said casing having inlet and outlet openings such that the article transferred along said path can pass therethrough;
   a partition plate disposed within said chamber to divide said chamber into an upper space and a lower space, said partition plate having an aperture adjacent said solder wave so that said upper space is in gas communication with said lower space only through said aperture; and
   inert gas feeding means for supplying an inert gas to said lower space through said aperture,
   said inert gas feeding means including at least one gas flow controlling device comprising:
      a housing member having a gas inlet and a gas outlet and including a pair of opposing first and second plates, each of said first and second plates extending from a short edge adjacent said gas inlet to a long edge, longer than said short edge and adjacent said gas outlet, each of said first and second plates having opposing and diverging side edges Joining said long and short edges, and a pair of opposing third and fourth plates joining the diverging side edges of said first and second plates to define within said housing a gas flow passage of a cross-sectional area which increases from said gas inlet to said gas outlet, and
      a plurality of spaced apart baffle plates alternately depending from said first and second plates.

3. An apparatus as claimed in claim 2, comprising four of said gas flow controlling devices, wherein a pair of said gas flow controlling devices are disposed opposite to each other to supply said inert gas in the direction normal to said predetermined path of travel of the article, wherein another pair of said gas flow controlling devices are disposed opposite to each other to supply said inert gas in the same and opposite directions in which the article is transferred along said predetermined path of travel.

4. An apparatus as claimed in claim 2, further comprising a cover plate disposed in said upper space to reduce that space in said upper space which is in gas communication with said lower space.

5. An apparatus as claimed in claim 2, wherein said inert gas feeding means includes an additional gas flow controlling device provided in said outlet opening below said predetermined path of travel of the article and comprising:

a housing member having a gas inlet and a gas outlet and including a pair of opposing first and second plates, each of said first and second plates extending from a short edge adjacent said gas inlet to a long edge, longer than said short edge and adjacent said gas outlet, each of said first and second plates having opposing and diverging side edges joining said long and short edges, and a pair of opposing third and fourth plates joining the diverging side edges of said first and second plates to define within said housing a gas flow passage of a cross-sectional area which increases from said gas inlet to said gas outlet, and a plurality of spaced apart baffle plates alternately depending from said first and second plates, said outlet being disposed so that said inert gas is directed to said solder wave.

6. An apparatus as claimed in claim 2, further comprising, connected to said outlet opening:

a tubular housing having top and bottom walls and defining an outlet path, and a plurality of upper and lower, spaced apart partition plates disposed in said outlet path to partition said outlet path into a labyrinth of a plurality of open ended chambers, each of said upper plates extending downward from said top wall, each of said lower plates extending upward from said bottom wall, and each of said upper and lower plates terminating so as not to interfere with said predetermined path of travel of said article.

7. A gas flow controlling device comprising:

a housing member having a gas inlet and a gas outlet and including a pair of opposing first and second plates, each of said first and second plates extending from a short edge adjacent said gas inlet to a long edge, longer than said short edge and adjacent said gas outlet, each of said first and second plates having opposing and diverging side edges joining said long and short edges, and a pair of opposing third and fourth plates joining the diverging side edges of said first and second plates to define within said housing a gas flow passage of a cross-sectional area which increases from said gas inlet to said gas outlet; and a plurality of spaced baffle plates alternately depending from said first and second plates.

8. A device as claimed in claim 7 wherein said third and fourth plates are each a planar member.

9. A device as claimed in claim 8 wherein first and second plates are planar and parallel to each other.

10. A device as claimed in claim 7 wherein first and second plates are planar and parallel to each other.

11. A device as claimed in claim 7 wherein each of said baffle plates extends across one dimension of said gas flow passage and has opposing ends respectively joined to said third and fourth plates, said baffle plates becoming progressively longer in said one dimension from said gas inlet to said gas outlet.

12. A device as claimed in claim 1 wherein each of said baffle plates extends across one dimension of said gas flow passage and has opposing ends respectively joined to said third and fourth plates, said baffle plates becoming progressively longer in said one dimension from said gas inlet to said gas outlet.

13. A device as claimed in claim 2 wherein each of said baffle plates extends across one dimension of said gas flow passage and has opposing ends respectively joined to said third and fourth plates, said baffle plates becoming progressively longer in said one dimension from said gas inlet to said gas outlet.

* * * * *